United States Patent [19]
Grimm et al.

[11] Patent Number: 5,095,662
[45] Date of Patent: Mar. 17, 1992

[54] PROCESS FOR HONING BORES AND A HONING MACHINE FOR PERFORMING THE PROCESS

[75] Inventors: Hans Grimm, Esslingen; Karl-Heinz Bergen, Filderstadt, both of Fed. Rep. of Germany

[73] Assignee: Maschinenfabrik Gehring GmbH & Co., Ostfildern, Fed. Rep. of Germany

[21] Appl. No.: 496,263

[22] Filed: Mar. 20, 1990

[30] Foreign Application Priority Data

Apr. 1, 1989 [EP] European Pat. Off. ........ 89105759.8

[51] Int. Cl.$^5$ .............................................. B21B 49/00
[52] U.S. Cl. .............................. 51/165.71; 51/165.74; 51/165.76; 51/165.77; 51/165.9; 51/165.93; 51/290; 51/281 P

[58] Field of Search ........... 51/165.85, 165.71, 165.79, 51/165.75, 165.9, 165.93, 165.91, 165.92, 165 R, 34 C, 34 D, 34 H, 34 J, 290, 281 P

[56] References Cited

U.S. PATENT DOCUMENTS

4,455,789  6/1984  Gehring ..................... 51/165.93 X
4,712,470  12/1987  Schmitz ..................... 51/165.9 X Primary Examiner—M. Rachuba
Attorney, Agent, or Firm—Foley & Lardner

[57] ABSTRACT

Pressure with which working parts of the honing tool are pressed against the bore wall is controlled during machining. The pressure per unit area of the working parts can thereby be kept constant or specifically varied, irrespective of the surface configuration of the bore wall. For this purpose, the honing machine includes a feed mechanism and electronic control device for predetermining the pressure of the working parts against the bore.

15 Claims, 2 Drawing Sheets

PROCESS FOR HONING BORES AND A HONING MACHINE FOR PERFORMING THE PROCESS

The invention relates to a process for honing bores, and a honing machine for performing the process.

BACKGROUND OF THE INVENTION

During the honing of bores, the working parts, normally designed as honing sticks, of the axially oscillating and rotationally driven honing tool are held so as to press against the bore wall. The conventional honing machine includes a feed mechanism which, after the tool is moved into the bore, moves the honing sticks radially toward the bore wall and produces contact pressure during the machining. The feed mechanism can be actuated hydraulically or mechanically. In hydraulic feed systems a constant feed force is produced. With mechanical feed systems, a certain feed displacement is predetermined. In this case, the feed force depends on the mechanical system and, in known processes, does not control the machining.

The feed force is concentrated on the particular bearing surface of the honing sticks at the bore wall. If this bearing surface decreases during machining, the pressure of the honing sticks per unit area increases. The rigidity of the feed system does not allow the honing sticks to give way.

A reduction in the bearing surface and, thus, an increased pressure per unit area results, for example, in regions of recesses and apertures in the bore wall, and also at the ends of the bore, since the honing sticks at these locations move with part of their lengths out of the bore before they are moved in again by stroke reversal of the honing tool. In blind-end bores and stepped bore walls there is also a narrowing of the bore at its inner limit, which likewise leads to an increased pressure per unit area. Differences in the pressure per unit area which occur during machining reduce the quality of the machined surface and lead to geometric inaccuracies in the workpiece. In addition, this results in nonuniform wear, particularly pronounced at certain locations, of the honing sticks, which frequently must be dressed for this reason.

SUMMARY OF THE INVENTION

An object of the invention is to further develop the honing process and known honing machines in such a way that the finish and accuracy of the machined bore wall, which depend on the pressure per unit area of the honing tool, are improved.

Another object of the invention is to reduce nonuniform wear of the working parts of the honing tool to a minimum.

These and other objects are achieved according to the invention in the known honing process by controlling the pressure of the honing tool against the bore wall during machining, and by use of the electronic feed-control device of this invention.

The control according to the invention, carried out during machining, of the pressure force with which the working parts of the honing tool are held against the bore wall enables the pressure per unit area of these working parts to be adapted to the particular conditions of the bore to be machined. The pressure per unit area can be kept constant, so that uniform removal of material results from the entire length of the bore, irrespective of any interruptions in the bore wall and, thus, a high geometric accuracy of the finish-machined bore is ensured. This also results in very uniform wear of the working parts, that is, for example, the honing sticks or honing stones, which then need to be dressed less frequently. But the pressure per unit area can also be specifically varied during the machining in order to achieve a desired operational result.

The electronic feed-control device provided on the honing machine, according to the invention, and intended for the feed mechanism of the working parts of the honing tool, permits automatic control of the pressure force with which the working parts are pressed against the bore wall during the stroke and rotary movement of the honing tool. This pressure force can be regulated to a predetermined required value or can also be controlled in accordance with an input program. Thus the honing is also automated with regard to the pressure force to be controlled according to the invention, so that the honing machine operates particularly efficiently.

Further features of the invention follow from the subclaims and the description below in which an exemplary embodiment is explained in greater detail with reference to the drawings, in which:

DETAILED DESCRIPTION OF THE PREFERRED EMBODIMENTS

Figure 1:
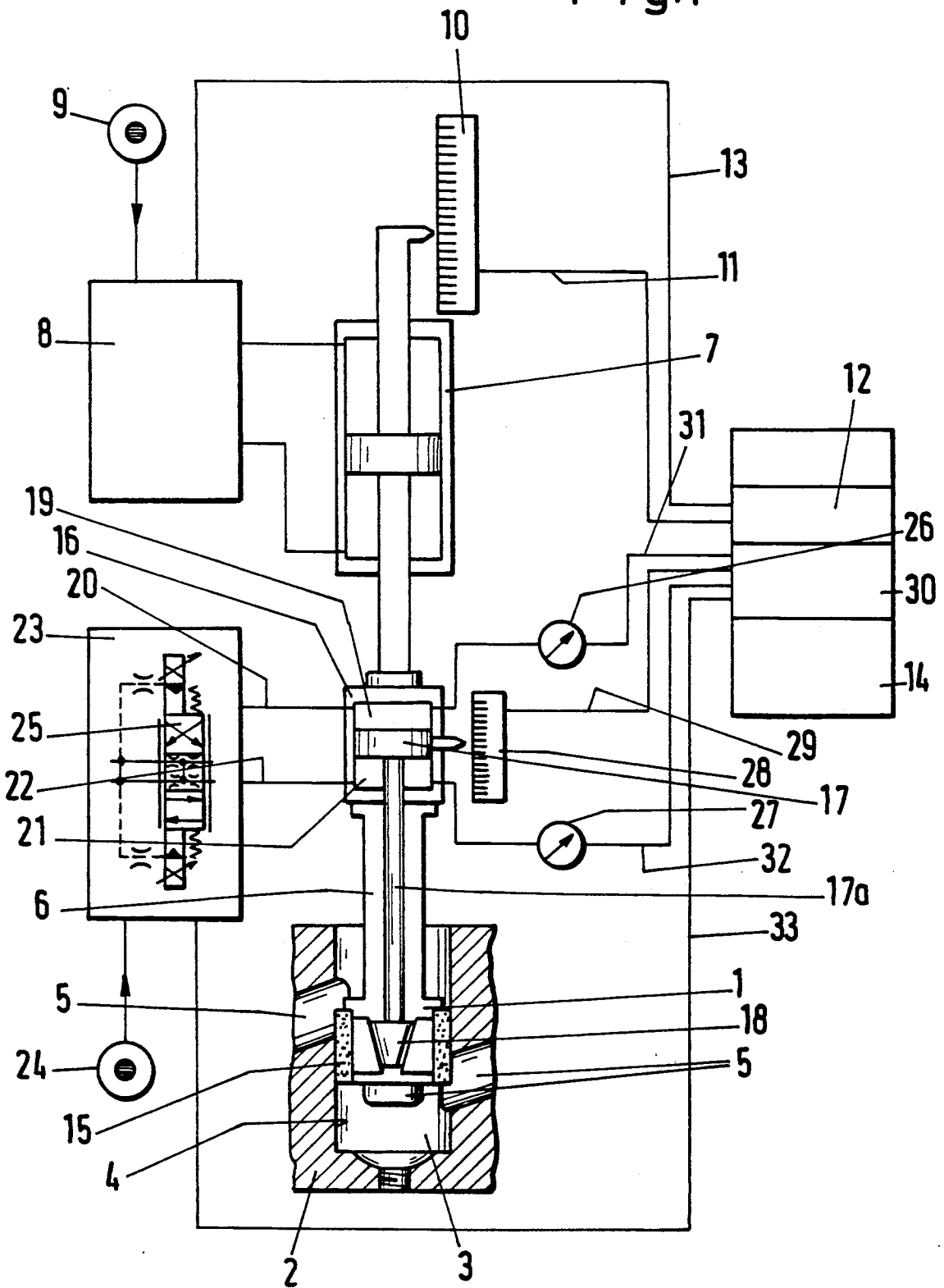
FIG. 1 is a schematic representation, and shows the parts of the honing machine essential to the invention.

FIG. 1 shows a honing tool 1 of the programcontrolled honing machine inside the bore 3 of a workpiece 2, which, in the present case, is a two-stroke cylinder having a cylindrical bore. The bore wall 4 is interrupted by a plurality of ports 5 which lead into the bore 3, that is, into the inner space of the cylinder 2, as apparent from FIG. 1 and also from the development of the bore wall according to FIG. 2.

The honing tool 1 is attached to a honing spindle 6 which is moved up and down in the direction of its longitudinal axis by a lifting drive, in the exemplary embodiment, by a hydraulic lifting cylinder 7. Leading into both chambers of the lifting cylinder 7 are pressure-medium lines of a hydraulic control unit 8 which is connected to a pressure-medium source 9. In addition, the honing spindle is set in rotation by a rotary drive (not shown).

A displacement transducer 10 is provided for stroke reversal. The displacement transducer 10 detects the vertical position of the honing spindle 6 and transmits digital or analog signals to a stroke-control device 12 via an electrical line 11. The particular vertical position of the honing spindle 6 and, thus, of the honing tool 1 within the stroke can thereby be determined.

The stroke-control device 12 is part of a program-control unit 14 of the numerically controlled honing machine (NC). The predetermined stroke is read into the program-control unit 14 so that, when certain values determined by the displacement transducer 10 are reached, the strokecontrol device 12, via a line 13, transmits a signal to the control unit 8 for reversing the stroke. This type of stroke reversal is known.

The honing tool 1 has, as working parts, honing sticks 15 which can be adjusted radially relative to the axis of the honing spindle 6. Provided for this purpose is a feed cone 18, which is displaceably guided on sloping surfaces of holders of the honing sticks 15 and can be adjusted in the axial direction of the honing spindle 6 by means of a feed mechanism 16. The feed mechanism consists of a piston-cylinder unit having a piston 17 which is located in the cylinder and to which piston rod 17a and feed cone 18 are fixed. The piston rod 17a lies centrally in the honing spindle 6. In each case one of two hydraulic lines 20 and 22 leads into the pressure chambers 19 and 21, present on either side of the piston 17, which lines 20 and 22 are connected to a pressure-medium source 24 via a hydraulic control unit 23. The control unit 23 contains a regulating valve 25.

Pressure sensors 26 and 27 are each connected via a measuring line to the two pressure chambers 19 and 21 of the feed mechanism 16. An electrical line 31 leads from the pressure sensor 26 to a measuring input of an electronic feed-control device 30 which is part of the program-control unit 14. Leading to a second measuring input of the feed-control device 30 is an electrical line 32 which is connected to the pressure sensor 27. In addition, there is allocated to the hydraulic feed mechanism 16 a measuring appliance 28 with which the position of the piston 17 in the cylinder of the feed mechanism is determined. For this purpose, the measuring appliance contains an incremental displacement transducer which therefore measures the piston movement in individual steps and whose measured values are converted inside the measuring appliance 28 into digital signals which are transmitted via an electrical line 29 to a further measuring input of the feed-control device 30. Dimensional control for machining the bore 3 is possible by means of the measuring appliance 28 via the feed-control device 30. The feed-control device 30 is connected via an electrical control line 33 to the regulating valve 25, for example actuated electromagnetically, of the hydraulic control unit 23.

The program-control unit 14 contains a computer which controls and monitors the sequence of all functions of the honing machine. Stored in this control unit 14 are data characteristic of the spatial allocation and the sequence of movement of the honing tool relative to the workpiece 2 to be machined.

Figure 2:
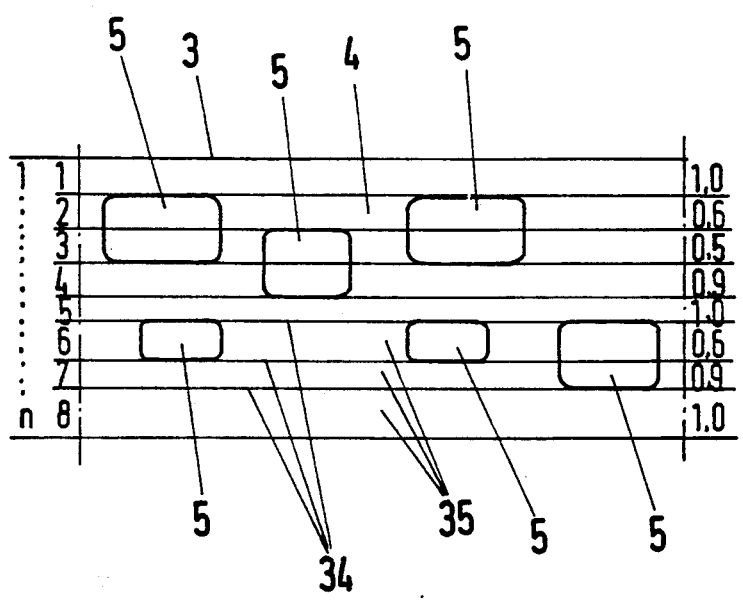
FIG. 2 shows a bore wall to be machined, the wall being subdivided by height lines.

In addition, data with which the configuration of the bore wall is recorded, which configuration is obtained from the development of the wall surface according to FIG. 2, are stored in the program-control unit 14. In the exemplary embodiment, the workpiece 2, that is, the two stroke cylinder to be honed, has transfer ports as well as inlet and exhaust ports 5, so that the bore wall 4 to be honed is interrupted at a plurality of locations, as FIG. 2 shows.

The development of the bore surface thus shown, for use as a reference system, is subdivided into n height sections 35 by parallel dividing lines 34 perpendicular to the bore axis; in the exemplary embodiment n=8. Starting from the value 1 for height sections not interrupted by port orifices, all height sections 35 are given a value which corresponds to a fraction of the value 1 in accordance with the area of the height section present in each case; the values given in the exemplary embodiment are marked on the right hand side in FIG. 2 on the dividing lines 34. Thus, for example, the area remaining in the third height section after subtraction of the interruption=0.5, which means that the surface of the bore wall 4 is reduced by 50% within this height section. The values, established in this way, for the respective surface portion are stored in the program-control unit 14 while being allocated to the corresponding height sections.

During honing, the size of the respectively machined surfaces of the bore wall 4, via a computer program stored in program-control unit 14, is calculated from data which are characteristic of the tool and the workpiece and which also identify the tool stroke position measured by the displacement transducer 10, and which are stored in the program-control unit 14. The computed result is directly analyzed for controlling the pressure with which the honing sticks 15 are pressed against the bore wall 14. The pressure can be controlled in such a way that the pressure per unit area of the honing sticks 15 remains constant. For the control of pressure, the required value of the pressure which the piston 17 via the piston rod 17a has to exert as feed pressure on the feed cone 18 in order to produce the predetermined radial pressure force is determined in the feed-control device 30 from the computed result. In the feed-control device 30, this required value is compared with the actual value, which, via the two pressure sensors 26 and 27, is determined as a differential pressure between the two pressure chambers 19 and 21. If the actual value deviates from the required value, the feed-control device 30 delivers a signal via the control line 33 to the regulating value 25 of the hydraulic control unit 23, which then readjusts the pressure in the cylinder of the feed mechanism 16 to the required value via the hydraulic lines 20 and 22.

Figure 3:
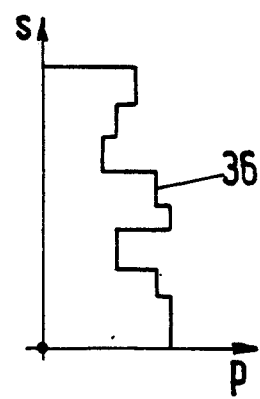
FIG. 3 shows the profile of the pressure force over the length of the bore during a working stroke of the honing took, when machining the bore wall according to FIG. 2.

In FIG. 3, the values of the regulation differential pressure in the chambers 19 and 21 for the displacement S of a working stroke are plotted against the pressure P, where a stepped pressure profile 36 in accordance with the values for the height sections 35 (FIG. 2) results. The stored data characteristics of the development of the bore wall, therefore, lead to changes in the pressure profile 36, each height section 35 influencing the feed pressure in accordance with the surface portion of the bore wall. A small surface portion, for example in the second and third height section 35, results in a smaller contact area between the honing sticks and the bore wall, and accordingly the feed pressure and, thus, the contact pressure are reduced via the control system so that the pressure per unit area remains constant. The same effect results at the ends of the bore during the overrun of the honing sticks, which therefore partly move out of the bore there, since the size of the contact area between honing sticks and bore wall then also decreases.

Instead of regulating for constant pressure per unit area, it can be convenient for certain machining cases to specifically vary the pressure per unit area. For example, if the bore wall contains material portions of varying hardness or if there are narrow points in the bores, the pressure per unit area can be increased or reduced during a working stroke at certain stroke positions in order to adapt the machining to these conditions. Likewise, a change in the pressure per unit area for achieving a certain bore shape can be initiated by program control.

The control of pressure and thus of the pressure per unit area can also be used for a dimensional control. Provided for this purpose is a measuring appliance 28 with which the position of the piston 17 in the cylinder of the feed mechanism 16 is detected and fed as a signal to the feed-control device 30. Since the position of the piston 17 is at the same time a measure of the expanded position of the honing sticks 15 and thus also a measure of the width of the bore 3, the bore diameter achieved in each case can be determined in this way and the corresponding signal can be used to end the machining after the required size is reached. Likewise, this dimensional control can be used to achieve a higher dimensional accuracy and surface finish of the bore. If, for example, the measuring appliance 28 indicates to the feed-control device 30 that a bore size is reached which is only slightly below the predetermined finished size, the pressure and thus the pressure per unit area can be reduced for the finish machining, which has an advantageous effect on the quality of the workpiece with regard to dimensional accuracy and surface finish.

What is claimed is:

1. A process for honing a bore having an axis and at least one port in the wall of the bore, comprising the steps of:
    (a) positioning a honing tool equipped with honing means within the bore and pressuring the honing means radially against the bore wall;
    (b) reciprocating the honing tool and rotating the same about its longitudinal axis, thereby pressuring the honing means against the bore wall in different planes extending transversely to the axis of the bore;
    (c) measuring the pressure force exerted by the honing means against the wall of the bore being honed and at the port in such different planes;
    (d) comparing the measured pressure force at each particular plane within the bore and at the port to a reference value according to a predetermined pressure force per unit area of contact between the bore wall and the honing means for an area of the bore wall including that plane; and
    (e) analyzing and utilizing the results of that comparison for controlling the pressure force of the honing means against the bore wall as a function of the size of the contact area between the honing means and the bore wall so that the honing means exerts such predetermined pressure force per unit area of contact between the bore wall and the honing means, against the bore wall.

2. The process as claimed in claim 1, wherein the radial pressure is controlled so that the honing means exerts a constant radial pressure per unit area of contact between the base wall and the honing means, against the bore wall.

3. The process as claimed in claim 1, wherein the radial pressure is controlled so that the honing means exerts an adjustably variable pressure force per unit area of contact between the bore wall and the honing means, against the bore wall.

4. The process as claimed in claim 1, wherein the radial pressure applied by the honing means is electronically controlled by a programmable computer.

5. The process as claimed in claim 1, wherein the radial pressure exerted by the honing means against the bore wall is additionally controlled as a function of the bore size measured during machining.

6. The process as claimed in claim 1, wherein geometric and other data needed to control the honing of the bore at particular pressures are electronically stored.

7. The process as claimed in claim 6, wherein the size of the contact area between the honing means and the bore wall is determined by an electronic computer, said computer receiving data indicating the geometry of the workpiece being honed, the geometry of the honing means and the predetermined motion sequence of the honing tool.

8. The process of claim 7, wherein the configuration of the wall being bored is represented by a reference system subdivided by parallel dividing lines into height sections, and wherein the size of the surface area of each height section is calculated and stored by said computer.

9. The process as claimed in claim 5, wherein the required pressure values are calculated from stored data representing the predetermined dimensions and movement sequences, these calculated values being compared during honing to measured and calculated actual values characterizing the size of the contact area between the honing means and the bore wall, and wherein the radial pressure is adjusted to the predetermined values.

10. A honing machine for honing a bore having an axis and at least one port in the wall of the bore, comprising:
    a honing tool;
    a honing means carried by the honing tool;
    a drive means for positioning the tool within the bore by reciprocating the tool along its longitudinal axis;
    a stroke displacement transducer for indicating the position of the drive mans along its longitudinal axis;
    a rotary drive for the honing tool;
    a feed mechanism for moving the honing means radially toward and away from the bore wall;
    means for measuring the pressure force exerted by said honing means against the wall of the bore being honed and at the port, and
    and electronic feed-control device which controls the radial movements of the honing means to achieve a pressure force per unit area of contact between the bore wall and the honing means, said pressure force being based on the pressure force measured against the wall and at the port by said measuring means.

11. The honing machine of claim 10, wherein the feed mechanism includes a hydraulic piston system, a feed control device, and a hydraulic control unit, the hydraulic control unit controlling the pressure acting on the piston in accordance with commands received from the feed control device.

12. The honing machine as claimed in claim 11, wherein the hydraulic piston system includes:
    a hydraulic chamber on each side of the piston; and
    a pressure sensor communicating with each hydraulic chamber, the pressure sensors being connected to the feed control device for indicating the pressure of the honing means against the bore being honed, the feed control device delivering commands to the hydraulic control unit to adjust as needed the pressure of the honing means against the bore walls.

13. The honing machine as claimed in claim 11, further including a measuring appliance for indicating the position of the piston.

14. The honing machine of claim 11, further including a program unit having a computer with stored data, the program unit including the feed control device, the program unit communicating with the stroke displacement transducer, wherein the computer determines on the basis of stored and measured tool and workpiece data and the stroke displacement measurement the size of the contact area between the honing means and the bore wall.

15. A honing machine for honing a bore wall in a workpiece, said bore wall having at least one port, comprising:
a honing tool;
honing means carried by the honing tool;
first hydraulic means for positioning the honing means axially within the bore in different planes extending transversely to the axis of the bore;
second hydraulic means for moving the honing means radially inwardly or outwardly to, respectively, decrease or increase the pressure of the honing means against the bore wall;
means for measuring the pressure force exerted by the honing means against the bore and at the port in such different planes,
means for comparing the measured pressure force at each particular plane within the bore and at the port to a reference value according to a predetermined pressure force per unit area of contact between the bore wall and the honing means for an area of the bore wall including that plane, and
computer means utilizing the results of such comparison for adjusting the second hydraulic means so that said honing means exerts such predetermined pressure force per unit area of contact between the bore wall and the honing means, against the bore wall.

* * * * *